United States Patent [19]

Freedman

[11] Patent Number: 4,530,905

[45] Date of Patent: Jul. 23, 1985

[54] CROSSLINKED GELATIN FOAMS

[75] Inventor: Harold H. Freedman, Wayland, Mass.

[73] Assignee: The Dow Chemical Company, Midland, Mich.

[21] Appl. No.: 664,664

[22] Filed: Oct. 25, 1984

[51] Int. Cl.$^3$ .................. C09H 7/00; C07G 7/02; C08H 1/06; C12N 11/06

[52] U.S. Cl. .................. 435/177; 260/117; 435/181; 435/182; 435/188

[58] Field of Search .............. 260/117; 435/181, 182, 435/188, 177

[56] References Cited

U.S. PATENT DOCUMENTS

| | | | |
|---|---|---|---|
| 2,614,930 | 10/1952 | Lowe et al. ............... | 260/117 X |
| 3,057,782 | 10/1962 | Lindner et al. ............ | 260/117 X |
| 3,516,834 | 6/1970 | Audran et al. ............. | 260/117 X |
| 3,838,007 | 9/1974 | Van Velzon ............... | 435/182 X |
| 3,859,169 | 1/1975 | O'Driscoll et al. .......... | 435/182 |
| 4,094,744 | 6/1978 | Hartdegen et al. .......... | 435/182 |
| 4,163,691 | 8/1979 | Devos et al. .............. | 435/182 X |
| 4,177,038 | 12/1979 | Biebricher et al. ......... | 435/181 X |
| 4,195,127 | 3/1980 | Hartdegen et al. .......... | 435/182 X |
| 4,237,229 | 12/1980 | Hartdegen et al. .......... | 435/182 |
| 4,266,029 | 5/1981 | Branner-Jorgenson ........ | 435/176 |
| 4,349,470 | 9/1982 | Battista ................... | 260/117 X |
| 4,352,695 | 10/1982 | Tomka .................... | 260/117 X |
| 4,411,999 | 10/1983 | Shigesada et al. .......... | 435/177 |
| 4,412,000 | 10/1983 | Lehmann et al. ........... | 435/181 X |
| 4,416,992 | 11/1983 | Arena et al. .............. | 435/181 X |
| 4,421,847 | 12/1983 | Jung et al. ............... | 260/117 X |
| 4,425,434 | 1/1984 | Rosevear ................. | 435/182 X |
| 4,478,938 | 10/1984 | Freedman ................ | 260/112 R X |

Primary Examiner—Howard E. Schain

[57] ABSTRACT

Gelatins are crosslinked in a non-anhydrous environment to yield water-swellable, essentially water-insoluble foams. The gelatin is contacted with a polyisocyanate at a pH between about 6 and about 8 and subjected to a high rate of agitation. The process of this invention can be employed to immobilize proteins, enzymes, antibodies, etc.

10 Claims, No Drawings

4,530,905

CROSSLINKED GELATIN FOAMS

BACKGROUND OF THE INVENTION

This invention relates to crosslinked polymers, and in particular, to crosslinked polymers which form water-swellable, water-insoluble foams.

Linear polyalkylenepolyamines are rendered water-insoluble through the addition of diisocyanates at a temperature between about 30° C. and about 200° C., using techniques disclosed in U.S. Pat. No. 4,087,413. Unfortunately, the resulting water-insoluble products are prepared either in neat form or in the presence of a suitable solvent. Reactions of amines with diisocyanates are disclosed in U.S. Pat. No. 4,177,038. However, it is typically necessary to prepare such products under essentially anhydrous conditions because isocyanates moieties are hydrolyzed rapidly by water to yield substituted ureas.

More recently, as disclosed in U.S. patent Ser. No. 585,744, filed Mar. 2, 1984, now U.S. Pat. No. 4,478,938, issued 10/23/84 linear polyalkylenepolyamines can be crosslinked in a non-anhydrous environment by contacting the polyalkenepolyamine with a polyisocyanate in an aqueous liquid at a specific pH and subjecting the mixture to high shear. Although essentially water-insoluble gels are prepared, these gels find limited uses.

In view of the fact that known processes provide gelled materials, it would be highly desirable to provide a process for efficiently preparing stable, water-swellable but water-insoluble foams.

SUMMARY OF THE INVENTION

The present invention is a process for providing stable, water-swellable, essentially water-insoluble foam wherein a polyisocyanate is contacted with an aqueous liquid comprising a gelatin which is at a specific pH and which is subjected to a sufficiently high rate of shear agitation. By the term "specific pH" is meant a pH which can range from slightly acidic to slightly basic.

The advantage of the process of this invention is that foamed materials can be prepared quickly and efficiently under conditions which do not require an anhydrous environment. Foams which are prepared can be dried in order to provide gels which are hard, soft, friable, etc. Upon drying the foam structure is maintained and the original gel can be regenerated by swelling in water. Typically, foams are closed cell foams. The foams are useful in a wide variety of applications in which water-insoluble, swellable foams are useful. Of particular interest, are those uses in which a foam is useful as a biosupport for the isolation and purification of enzymes and other proteins where a proteinaceous environment is desirable.

Thus, in another aspect the present invention is a process for covalently immobilizing a protein wherein said protein is contacted with a gelatin and a polyisocyanate in an aqueous liquid which is at a specific pH and which is subjected to a sufficiently high rate of agitation to yield a water-swellable, essentially water-insoluble foam.

The immobilized proteins are useful for a variety of uses. For example, immobilized proteins can be used as catalysts or in the purification of bioproducts.

DETAIL DESCRIPTION OF THE INVENTION

As used herein, the term "gelatin" refers to those types of proteins which are obtained by the hydrolysis of collagen by boiling skin, ligaments, tendons, etc. Type A (obtained from acid treated raw materials) and Type B (obtained from alkali treated raw materials) can be employed. Most grades of commercially available purified gelatins can be employed. Gelatins having a high bloom number; for example, greater than about 100; are preferred.

Organic polyisocyanates which can be employed include aromatic, aliphatic and cycloaliphatic polyisocyanates and combinations thereof. Representative of these types are the diisocyanates such as m-phenylene diisocyanate, tolylene-2,4-diisocyanate, tolulene-2,6-diisocyanate, hexamethylene-1,6-diisocyanate, tetramethylene-1,4-diisocyanate, cyclohexane-1,4-diisocyanate, hexahydrotolylene diisocyanate (and isomers), naphthylene-1,5-diisocyanate, 1-methoxyphenyl-2,4-diisocyanate, diphenylmethane-4,4-diisocyanate, 4,4'-biphenylene diisocyanate, 3,3'-dimethoxy-4,4'-biphenyl diisocyanate, 3,3'-dimethyl-4,4'-biphenyl diisocyanate, and 3,3'-dimethyldiphenylmethane-4,4'-diisocyanate; the triisocyanates such as 4,4',4''-triphenylmethane triisocyanate, polymethylene polyphenylisocyanate and tolylene-2,4,6-triisocyanate; and the tetraisocyanates such as 4,4'-dimethyldiphenylmethane-2,2',5,5'-tetraisocyanate. Especially useful due to their availability and properties are tolulene diisocyanate, diphenylmethane-4,4'-diisocyanate and polymethylene polyphenylisocyanate.

Crude polyisocyanate can also be used in the practice of the present invention, such as crude toluene diisocyanate obtained by the phosgenation of a mixture of toluene diamines or crude diphenylmethylene diisocyanate obtained by the phosgenation of crude diphenylmethylenediamine. The preferred undistilled or crude isocyanates are disclosed in U.S. Pat. No. 3,215,652.

The amount of polyisocyanate which is employed relative to the gelatin can vary depending upon factors such as the reactivity of the species, the concentration of reactants relative to the aqueous liquid, the amount of crosslinking desired and the like. Preferably, the amount of polyisocyanate ranges from about 1 to about 20, preferably about 2 to about 8 weight percent, based on the weight of the dry gelatin. Typically, poor foams are obtained or no permanent foaming occurs if there is employed an insufficient amount of polyisocyanate.

The process of this invention is perfomed in an aqueous liquid. Preferably, the aqueous liquid comprises essentially water. As used herein, the term "aqueous liquid" means a liquid comprising water which can contain additives soluble therein or immiscible therewith. For example, the aqueous liquid can contain an aqueous phase comprising water and additives soluble therein, and a water immiscible organic solvent. The amount of the water immiscible organic solvent can range, for example, from about 0.5:1 to about 5:1 relative to the volume of the aqueous phase. Examples of water immiscible organic solvents include benzene, toluene, methylenechloride, chloroform, and the like.

Typically, depending upon the gelatin, the pH of the aqueous liquid can range from about 4 to about 10, preferably 6 to about 8. The pH of the aqueous liquid is critical as the rate of crosslinking is sensitive to pH. That is, for example, the crosslinking reaction can occur too quickly if the pH is exceedingly high. Conversely, the crosslinking reaction can occur very slowly if the pH is exceedingly low. In addition, poor foams are obtained or no foaming occurs if the pH of the aqueous liquid is not within a suitable (i.e., specific) range. The pH typically decreases by a small amount (i.e., less than about 1 unit) during the crosslinking reaction. This change in pH can be controlled by a suitable buffer.

The amount of aqueous liquid which is employed depends upon the molecular weight and the amount of gelatin which is employed. Typically, poor foaming occurs if the polymer solution is very dilute or the molecular weight of the polymer is very low. Conversely, the formation of desirable foams is a difficult process to perform if the polymer concentration in the aqueous liquid is very high or the molecular weight of the polymer is very high. Preferably, the amount of gelatin present in the aqueous liquid can range from about 0.5 to about 20, preferably from about 1 to about 10 weight percent, based on the weight of the polymer and aqueous liquid.

The temperature at which the process of this invention is performed is not particularly critical and can vary. For example, the process of this invention can be performed from about 0° C. to about 30° C. or higher. Typically, crosslinking is carried out at room temperature.

The process of this invention is highly dependent upon the rate of agitation to which the aqueous gelatin/polyisocyanate mixture is subjected. Little or no foaming occurs when a conventional magnetic stirrer or mechanical stirrer is employed as an agitation device. For this reason, it is necessary to provide a sufficiently high rate of agitation using a device such as a homogenizer, ultra-sonic stirring device or blender. Typically, the agitation rate should exceed about 500 rpm, preferably about 3,000 rpm. Preferred agitation rates range from about 5,000 rpm to about 50,000 rpm, most preferably from about 10,000 rpm to about 20,000 rpm. It is understood that practically any device capable of providing such a high rate of agitation can be effectively employed.

The gelatin/polyisocyanate mixture is subjected to a high rate of agitation for a period of time which can vary. For example, the period of time over which the mixture is subjected to agitation can depend upon factors such as the amount of reactants, the concentration of reactants in the aqueous liquid, etc. Typically, the period of time over which the mixture is subjected to agitation can range from about 2 seconds to several minutes, preferably from about 20 seconds to about 2 minutes, most preferably for about 30 seconds.

In the situation in which a two phase (i.e., aqueous solvent and water-immiscible solvent) solvent system is employed, hydrolysis of the isocyanate is believed to be retarded. Thus, conventional stirring devices such as magnetic stirrers or mechanical stirrers can be employed to yield good results. However, the rate of crosslinking is much slower than that observed when high rates of agitation are employed. That is, reaction times ranging from several minutes to about 1 hour may be necessary for sufficient crosslinking to occur. In any event, the actual reaction time can depend upon factors such as the particular polymer, the isocyanate concentration, the relative amount of solvent, the proportions of aqueous phase and water immiscible phase, etc.

After the mixture is subjected to agitation, the foam is allowed to set for a period of time sufficient for foam formation (i.e., crosslinking) to be completed. This period of time ranges from about a few minutes to about several hours, preferably from about 1 hour to about 8 hours, most preferably for about 2 hours. Setting can occur over a wide temperature range, but preferably occurs at room temperature.

The process of this invention is most preferably carried out in a predominately aqueous phase. It is understood that most additives common in an aqueous liquid can be present. For convenience purposes, the water-soluble gelatin is dispersed in the aqueous liquid and a solution is formed, which solution has the appropriate pH. This solution is contacted with the polyisocyanate, and the mixture is subjected to a sufficiently high rate of agitation for a short period of time. The mixture is then allowed to set. If desired, the resulting foam can be dispersed in an aqueous liquid by providing further agitation. If desired, the foam can be dried. In any case, the foam can be further treated, as desired, for the particular application for which it is employed.

Proteins containing free primary amine groups, such as enzymes and antibodies, can be immobilized using the process of this invention. For example, glucose oxidase, esterase, catalase, alkaline phosphatase, and the like can be easily and effectively immobilized. Preferably, the gelatin, polyisocyanate and protein are contacted in the suitable solution at the suitable pH and subjected to the appropriate agitation. Typically, the amounts of protein which is employed ranges from about 0.1 to about 10 milligrams per milliliter of gelatin which is employed.

When employed as a biosupport for enzyme immobilization, the reaction conditions under which the gels are formed can be modified in accordance with the requirements necessary for the individual enzyme. Covalent attachment of the enzyme to the foam can occur during the mixing and foaming stages. It is believed that immobilization occurs via the reaction of free isocyanate moieties of the foam with amino moieties of the protein. If desired, the enzyme active site can be protected from reaction by the presence of suitable enzyme substrates and/or products. The amount of immobilized protein can vary. The enzyme activity of the immobilized enzyme can also vary and is typically from 20 to about 80 percent of its original value.

The foams which are prepared are very hydrophilic, though essentially water-insoluble. When dry, the foams can be hard and/or friable solid materials which maintain foam structure and can be easily handled. When fully hydrated, the foams are transparent to translucent, soft, compressible solids which are insoluble in water. The foams are typically closed cell foams.

The foams can be employed as water adsorbent materials, insoluble chelants for metals, insoluble modifiers of pH for aqueous systems, biosupports, and other such uses.

The following examples are presented to further illustrate but not limit the scope of this invention.

EXAMPLE 1

15 ml of a 7.5 percent solution of 300 bloom swine skin gelatin is adjusted to a pH of 8. To this mixture is added 0.1 ml hexamethylene-2,4-diisocyanate and the mixture is homogenized for 30 seconds at high speed using a Ross Laboratory Homogenizer (12 mm head). The resulting foam which has a volume of about 25 ml is set in about one minute. The foam is air dried to yield about 15 ml of a firm white foam.

EXAMPLE 2

15 ml of a 7.5 percent solution of 200 bloom technical grade gelatin containing 0.15 ml of alkaline phosphatase (Sigma No. P4502) is adjusted to a pH of 8. To this mixture is added 0.1 ml hexamethylene-2,4-diisocyanate and the mixture is homogenized as in Example 1. The foam gels slowly enough to be cast as a film. After air drying for three days and reswelling in water, the washed film assays for most of the original enzyme activity.

EXAMPLE 3

5 g of a 10 percent solution of 200 bloom gelatin is diluted with 10 ml water and the pH of the mixture is adjusted to about 8.5. To this is added one drop of a liquid emulsifier. To this is added 0.1 ml of hexamethylene-2,4-diisocyanate and the mixture is immediately homogenized as described in Example 1. The mixture sets to a white, soft foam with a volume of about 50 ml. After thorough drying at room temperature, the volume of the white collapsed foam is about 20 ml and the foam weighs 0.7 g.

What is claimed is:

1. A process for providing stable, water-swellable, essentially water-insoluble foam wherein a polyisocyanate is contacted with an aqueous liquid comprising a gelatin which is at a specific pH and which is subjected to a sufficiently high rate of shear agitation.

2. A process of claim 1 wherein said aqueous liquid comprises essentially water.

3. A process of claim 2 wherein the rate of agitation is in excess of about 3,000 rpm.

4. A process of claim 1 wherein said specific pH ranges from about 6 to about 8.

5. A process of claim 1 wherein said aqueous liquid comprises water and a water immiscible organic solvent.

6. A process of claim 1 wherein said polyisocyanate is a diisocyanate.

7. A process of claim 1 wherein said aqueous liquid comprises a protein.

8. A process of claim 7 wherein said protein is an enzyme.

9. A process for covalently immobilizing a protein wherein said protein is contacted with a gelatin and a polyisocyanate in an aqueous liquid which is at a specific pH and which is subjected to a sufficiently high rate of agitation to yield a water-swellable, essentially water-insoluble foam.

10. A process of claim 9 wherein said protein is an enzyme.

* * * * *